US010456953B2

(12) United States Patent
Göbel (10) Patent No.: US 10,456,953 B2
(45) Date of Patent: Oct. 29, 2019

(54) DEVICE AND METHOD FOR CYCLE- AND COST-OPTIMIZED THERMAL TRANSFORMATION OF HOSE BLANKS (71) Applicant: CREATIVE BALLOONS GmbH, Waghäusel (DE)

(72) Inventor: Fred Göbel, Wilhelmsfeld (DE)

(73) Assignee: Creative Balloons GmbH, Waghäusel (DE)

( * ) Notice: Subject to any disclaimer, the term of this patent is extended or adjusted under 35 U.S.C. 154(b) by 169 days.

(21) Appl. No.: 15/306,609

(22) PCT Filed: Apr. 27, 2015

(86) PCT No.: PCT/IB2015/000580
§ 371 (c)(1),
(2) Date: Oct. 25, 2016

(87) PCT Pub. No.: WO2015/162490
PCT Pub. Date: Oct. 29, 2015

(65) Prior Publication Data
US 2017/0043507 A1 Feb. 16, 2017

(30) Foreign Application Priority Data

Apr. 25, 2014 (DE) .......... 10 2014 005 902
Feb. 16, 2015 (DE) .......... 10 2015 001 828

(51) Int. Cl.
B29C 33/38 (2006.01)
B29C 33/40 (2006.01)
B29C 35/00 (2006.01)
B29C 67/00 (2017.01)
B29C 48/25 (2019.01)
B29C 48/00 (2019.01)
B29C 48/79 (2019.01)
B29C 49/48 (2006.01)
B21D 26/033 (2011.01)
B29L 24/00 (2006.01)
B29L 31/00 (2006.01)
B29L 23/24 (2006.01)
B29K 75/00 (2006.01)
B29K 105/00 (2006.01)

(52) U.S. Cl.
CPC ........ *B29C 33/3828* (2013.01); *B21D 26/033* (2013.01); *B29C 33/40* (2013.01); *B29C 35/007* (2013.01); *B29C 48/001* (2019.02); *B29C 48/25* (2019.02); *B29C 48/79* (2019.02); *B29C 49/4823* (2013.01); *B29C 67/0014* (2013.01); *B29C 2049/4838* (2013.01); *B29K 2075/00* (2013.01); *B29K 2105/258* (2013.01); *B29K 2995/0013* (2013.01); *B29L 2023/24* (2013.01); *B29L 2024/00* (2013.01); *B29L 2031/7543* (2013.01)

(58) Field of Classification Search
CPC ..... B29C 33/3828; B29C 33/40; B29C 35/00; B29C 35/007; B29C 48/001; B29C 48/25; B29C 48/79; B29C 67/0014; B29C 49/4823; B29C 2049/4838; B29K 2995/0013; B29L 2023/24; B29L 2024/00
USPC ............... 264/36.15, 36.16, 521, 563, 176.1, 264/177.14, 177.17, 209.1, 209.3, 209.4, 264/210.1, 210.2, 210.5, 211.12, 234, 264/238, 280, 299, 319, 320, 327, 330, 264/331.11, 331.12, 331.15, 331.18, 264/331.21, 345; 425/522, 526, 317, 392, 425/445, 446
See application file for complete search history.

(56) References Cited

U.S. PATENT DOCUMENTS

| | | | | |
|---|---|---|---|---|
| 2,363,508 A | * | 11/1944 | Doster et al. | B29D 30/0681 152/DIG. 7 |
| 4,550,007 A | * | 10/1985 | Ohtsu | B29C 49/6445 264/521 |
| 5,516,470 A | * | 5/1996 | Larsson | B29C 33/046 249/79 |
| 2006/0051451 A1 | * | 3/2006 | Hutchinson | B29C 33/046 425/552 |

FOREIGN PATENT DOCUMENTS

| | | |
|---|---|---|
| DE | 102010020090 | 11/2011 |
| DE | 102011114083 | 3/2013 |
| EP | 2216066 | 8/2010 |
| WO | WO 2009/144028 | 12/2009 |
| WO | WO 2013/041234 | 3/2013 |

* cited by examiner

Primary Examiner — William P Fletcher, III
(74) Attorney, Agent, or Firm — Pandiscio & Pandiscio (57) ABSTRACT A device and a method for the thermal reshaping of hose blanks from preferably pre-extruded elastic raw hose material, wherein during the reshaping, the hose blank is arranged in a shell-like, single- or multi-piece molding tool with a hollow body, wherein the tempering of the molding tool that is necessary for reshaping occurs by means of clamp-like tempering elements which are shaped congruently to the outer surface of the mold and which close form-fittingly over the mold, while the molding tool itself does not comprise any tempering system at all, in particular no ducts or other hollow spaces for circulating a tempering medium, and wherein the temperature of each tempering element is kept constant during the process, while, to modify the temperature of the molding tool, a different tempering element with a correspondingly constant temperature is positioned against the molding tool.

18 Claims, 4 Drawing Sheets

DEVICE AND METHOD FOR CYCLE- AND COST-OPTIMIZED THERMAL TRANSFORMATION OF HOSE BLANKS

REFERENCE TO PENDING PRIOR PATENT APPLICATIONS

This patent application claims benefit of International (PCT) Patent Application No. PCT/IB2015/000580, filed 27 Apr. 2015 by Creative Balloons Maschinenbau GmbH & Co. KG and Fred Göbel for DEVICE AND METHOD FOR CYCLE- AND COST-OPTIMIZED THERMAL TRANSFORMATION OF HOSE BLANKS, which claims benefit of: (i) German Patent Application No. DE 10 1014 005 902.2, filed 25 Apr. 2014 and (ii) German Patent Application No. DE 10 2015 001 828.0, filed 16 Feb. 2015, which patent applications are hereby incorporated herein by reference.

FIELD OF THE INVENTION

The present invention is directed to a device and a method for the thermal reshaping of hose blanks consisting preferably of a pre-extruded elastic raw hose material, wherein the hose blank is located in a shell-like, single- or multi-part molding tool during the reshaping, wherein the inner side of the hollow mold corresponds as a negative to the shape that is to be impressed upon the hose blank with the purpose of producing hose elements with complex shapes from unshaped raw hose material, such as can be used, for instance, as tire inner tubes in the automotive industry or in the production of shaped balloon and hose components for transfusion or drainage catheters in the field of medical technology. Additionally, a method is presented for the particularly economical large-scale production of this type of hose elements in which the process and effort are optimized.

The invention is preferably based on the molding of pre-extruded hose blanks consisting of elastic polyurethane (PUR). Using the concrete application example of molding the basic body of a stool drainage device for the closed drainage of stool from the patient's rectum into a bag-like receptacle as well as the application example of shaping a bicycle tire tube, the following text is intended to demonstrate how a conventionally extruded PUR hose blank can be processed by thermal deformation into a product which is optimized in terms of form, function, and durability and/or into a product which cannot be manufactured by primary extrusion in its specific combination of wall thickness and diameter. In so doing, the invention primarily addresses the speed of the thermal deformation process as an essential cost optimization factor during the large-scale manufacture of products. The aspect of the cycle speed is taken into account notably when designing the molding tools that are required for the optimized process as well as when introducing and dissipating the thermal energy into the molding tool.

For cycle-optimized reshaping, the invention proposes systems which introduce or dissipate energy and which are continuously tempered, i.e. are not alternatingly tempered, and which thus largely maintain a constant temperature during the molding process. Moreover, a quick transfer of energy from the energy source to the blank is made possible by keeping the molding materials as small as possible, and the walls of the molding tool are configured as symmetrically as possible to the contour of the workpieces. In the preferred embodiment, the energy-transmitting surfaces of the tempering devices that accommodate the molding tools are designed to be congruent in shape and symmetrical in contour to the respective outer surface of the molding tools.

BACKGROUND OF THE INVENTION

Devices for the cycle time-optimized molding of balloon elements from pre-extruded hose material have already been described. WO 2013/041234 describes a shaping device in which the hose blank is blown directly into a molding tool that has been flushed with a tempering medium. The hose element to be reshaped lies against the wall of the molding cavity of the primarily tempered molding tool. The molding tool comprises a hollow space that is flushed with a tempering medium and is configured with the lowest possible mass so that the particular molding temperature can be reached on the surface of the molding cavity as quickly as possible during a cyclical temperature change in the mold. In a preferred embodiment, a type of mold is described which is composed of two longitudinally divided half shells whose cavities close over the blank by being displaced from the lateral toward the blank. The tempered half shells remain closed for the duration of the blow-molding phase, i.e. during the heating and subsequent cooling of the workpiece. It is also possible for the half shell-like mold arrangement to be displaceable vertically relative to the hose blank. In the specific case described, the hose blank should be pre-tempered and/or pre-shaped before the actual blow-molding process. For this purpose, the mold moves up and down over the blank, alternatingly opening lengthwise and then closing again, over various levels of the mold. Optionally, a specific temperature corresponding to each functional level can be set in the mold. The method is suitable for the quick molding of small hose or balloon components, such as those required for common medical catheter products. However, the above method is unsuitable for large-volume components, especially long components, for components with significantly fluctuating segment diameters, for the cost-effective manufacture of long, extremely thin-walled hose components and for products manufactured in large amounts, since the mold masses required for the forming path described above tend to be relatively large and must be alternatingly tempered and/or alternatingly heated and cooled during the cycle, which is time and energy intensive.

PUR-based tire inner tubes are known commercially, and different types are available. Industrial production of the products is usually based on a continuously extruded semi-finished raw hose, which is cut to an appropriate length and the free ends of which are welded or glued directly, i.e. without a further molding step, end-to-end to create a closed ring element.

Conventional end-to-end welding of the hose ends, such as the process carried out on bicycle hoses of the type produced by Eclipse Microsystems GmbH of Ebmatingen, Switzerland, does not usually produce a visually and functionally satisfactory result. Although the joints usually exhibit sufficient mechanical reliability, the outwardly facing seam that results from the welding process is substantial in size and, apart from the appearance of the product, it could potentially affect its running properties and/or lead to a weakening of the wheel casing or the hose wall at the joint during continuous operation.

Since the raw hose material employed is normally produced by blown film extrusion, i.e. by vertical extrusion from a melt, the hose body is normally wound up as a flat band and retains this band structure throughout the rest of the processing of the product. Variations in the hose diameter and in the wall thicknesses of the hose casing usually result from the fast-running vertical extrusion. These variations can have a negative effect on the function and durability of the products.

SUMMARY OF THE INVENTION

The present invention describes possibilities for the cycle- and cost-optimized thermoforming or reshaping of an extruded raw hose; moreover, it discusses particular molding details which are advantageous for the further processing of the blank and for function and appearance and which are made possible in the finished tire inner tube by the described reshaping process.

Notably, specific molding details, which improve in particular the optical appearance and mechanical durability of the end-to-end connection, are created in the end regions of the hose casing by means of the described thermoforming. To this end, the invention proposes the formation of sleeve-like connecting structures which, primarily in the case of low wall thicknesses in the hose casing, permit a tightly sealing joining of the hose end pieces simply by inserting precisely shaped male and female elements into one another. Sleeve systems of this type offer substantial advantages in terms of production management, especially with film-like thin hose structures, during the assembly into closed ring structures and ensure high load stability in the joint area.

The molding of an extruded raw hose element described hereafter is based on multiple physical components that act upon the hose material. As a result of an initial stretching of the raw hose over its longitudinal axis, the amorphously oriented polymer chains in the blank are increasingly oriented and/or parallelized in the stretching direction, which improves the tensile strength and crack resistance of the material, regardless of the type of material and the processing parameters applied during the raw hose extrusion. The axial stretching used in each case corresponds to a thinning of the hose wall, wherein any irregularities in the diameter and in the wall thickness of the raw hose can be spread out and levelled and thereby advantageously reduced. The hose blank that is stretched lengthwise is then blown into a molding tool, which creates in its molding surface all of the surface features required for the assembly, function, and appearance.

Since the diameter of the stretched hose blank is usually smaller than the diameter of the molding tool, the hose is elongated radially during the blowing process in addition to being elongated axially, with the hose casing being given an additional radial polymer orientation and its walls being thinned even further. The respective proportion of axial and/or radial polymer orientation that is achieved determines the dimensional stability of the hose body when charged with filling pressure, and it determines stability under the effect of tensile, tearing and puncture forces. If the radial elongation component predominates, for instance, or if it is accompanied by a preferred radial orientation of the chains, a mechanism of elongation can be achieved in the hose in which a relatively precisely prescribed diameter measurement is set during filling, from which only a little or no more relevant elongation is possible when the pressure increases further. A method such as this largely prevents herniations, for example, such as those observed in hose casings made of natural rubber. In the other example, a hose casing can be produced that predominantly exhibits axial stretching and orientation, in which the inner hose circumference can be set with relative precision in relation to the diameter of the wheel or rim during filling and which, once mounted on the rim, exhibits stable behavior with a consistent diameter even under high strain while in use.

The hose expands axially and radially into the molding tool when subjected to blowing pressure and eventually lies flat against all of the blowing mold walls. By tempering the mold walls, the hose sleeve is then heated to a level which relaxes the configuration and/or orientation of the polymer chains. When the molded hose body is subsequently cooled, the orientation of the chains achieved in this way is fixed and the hose body is thereby prevented from elastically shrinking back into its original state. Since the orientation of polymer chains is generally associated with an improvement in stability, the strain-related stability can be maintained or improved, despite a reduction in wall thickness, and the hose can thereby be provided with dimensional and/or mechanical properties which cannot be achieved by a primary extrusion alone.

The present invention permits hose blanks with typical elasticity for polyurethane to be reshaped in an optimally simplified way in that the tempering element is separated from the actual molding tool, and the tempering element is form-fitted to the molding tool accommodating the blank to be reshaped such that the contact surfaces achieve the best possible fit. In the case of the tire inner tube, the molding tool preferably consists of a simple, substantially continuously cylindrical, thin-walled tube body, and all of the structural features that are required to assemble the hose ends into a closed ring or that optimize the running properties of the hose in the wheel casing, for example, are embossed and/or molded into the surface of said hollow body. The molding features of the inner tool walls are thus reproduced on the outer tool wall, preferably with a symmetrical contour. Alternatively to a continuous design, the molding tool can also have a configuration that is segmented and arranged consecutively in the longitudinal direction. The mold segments can be inserted into a thin-walled outer tube to provide stability over the longitudinal axis.

In the contact region, the invention provides a system of clamp-like tempering elements which are congruent in shape and custom-fit to the surface of the forming tube, wherein said elements move from the sides to the surface of the forming tube to supply and dissipate heat energy and they optimally cling sealingly to the wall of the tube body to ensure a more efficient transfer of energy into and out of the forming tube. In contrast to the prior art, the forming tube, as the actual molding tool, is not tempered by alternatingly heating and cooling structures that are integrated into the mold, but rather by secondary energy-conducting or energy-dissipating elements, the tempering of which is kept at a constant level.

The tube body and the described tempering clamps are preferably displaced vertically relative to each other. In this way, depending on the process step, a specifically tempered clamp unit can be positioned against the forming tube and pressed against it to transfer energy. As an alternative to the vertical relative displacement between the forming tube and the tempering clamps, a relative displacement in the horizontal can also be carried out.

The particular advantage of the described device consists in the option of constant temperature control in the tempering element. In contrast to the conventional molding technique described above, the clamp-like tempering elements can be configured to be high in mass so as to require as little temperature readjustment as possible, i.e. no over- or under-shoot significant to the current molding process, after contact with the molding tool and the heat transfer which then takes place.

To increase the rate of energy transmission from the tempering element to the molding tool, the tempering element can be maintained at a higher temperature level, as is required for the reshaping of the blank. The clamp-like tempering elements are thus pressed against the surface of the forming tube just for an appropriately short duration and then removed from the surface once a particular energy transfer has been completed.

The tempering elements are preferably heated with liquid media, preferably with oil. A temperature of e.g. 250 degrees Celsius is set in the tempering element to mold a PUR blank, such as the Elastollan 1185A by BASF, in a stainless steel tube with a 25 mm diameter and a wall thickness of ca. 0.5 mm. The contact time between the tube and the tempering element is preferably ca. 8 to 12 seconds, wherein a molding temperature of ca. 150 to 170° C. is reached on the forming surface of the tube.

The cooling occurs by means of corresponding clamp-like tempering elements which, for the sake of better heat conductivity, are kept at a constant cooling temperature, preferably with water. The reshaped hose can be removed when the forming tube reaches ca. 40° C.

The proposed relative arrangement and displacement of the molding tool and the tempering elements is especially well-suited for the continuous processing of raw hose, which is unwound from a roller and, from molding step to molding step, is drawn continuously from the material reserve side through the molding tool to the side where the blank is ventilated and pressurized.

An essential cost advantage in the production of blow molds can arise from the optional embossing of shapes by the molding tool according to the invention. For this purpose, a metal tube body that is as thin as possible and preferably has a greater heat conductivity is pressed into an embossing outer mold, which can be achieved, for example, by hydraulically pressurizing the tube interior. Alternatively, longitudinally divided forming tubes could also be deep-drawn, and the resulting half shells could then be permanently connected or welded into closed tube bodies. Molding tools can be manufactured and duplicated in a simple and cost-effective way by both compression molding methods.

The invention further describes longitudinally divided molding tools which can be produced e.g. by milling or eroding. The advantage of half shell-like molds of this type consists in that it is not necessary to pass the entire length of the raw hose through the molding tool before the axial stretching of the hose blank can take place. In the case of open half shells, the longitudinal division permits the hose blank to be introduced into the open mold up to a particular length and then to be fixed and sealed by clamping on the hose-supplying side upstream of the molding tool. On the side of the free hose end, it can be engaged by the insertion of a pin that ventilates the hose and then stretched until the hose end that is engaged with said pin is positioned outside of the open half shell. Only then is the form fit established over the stretched hose element. The initial length, i.e. before stretching, of the hose end introduced into the mold is dimensioned such that it can be stretched sufficiently for molding when it is stretched beyond the length of the molding tool. In this way, the molding can be performed in a way that optimally saves material, and a stretching-related waste of raw hose is avoided. Moreover, half shell-like molds permit quick access to the molding surface, which is necessary in the case of a rupture in the hose or for maintenance procedures.

The molding tools described in the invention are preferably milled from solid materials into half shell-like, profiled angle structures, which permit mounting on a mechanism that creates the powerful form fit while also permitting a maximum reduction in the wall thickness of the mold. Furthermore, angles such as these can be configured with a very long face-to-face length. For instance, they are ideally suited for the cost-effective molding of long chains from balloon-like structures, such as those required for cost-sensitive products in the field of catheter technology.

In some applications, on the other hand, such as the manufacture of a product with a particular diameter and a particular wall thickness, profiling is superfluous and the molding tool can have a purely cylindrical shape, which results in a significantly simplified overall design.

If the molding tool is produced with a symmetrical contour, i.e. if the outer wall of the mold has a contour at the points and surfaces involved in the molding of the blank which corresponds to the greatest possible extent with the inner contour of the molding cavity, then, after the mold walls have heated through for an appropriate amount of time, a good approximation of the molding temperature on the inner side of the molding cavity can be measured on the outside of the cavity, which makes it possible in principle to measure the actual molding-related tempering of the blank within the cavity on the outside of the cavity, e.g. by infrared optical scanning WO 2013/041234 presents a similar principle of the possibility of measuring the molding temperature on the contour-symmetrical outside of a mold, wherein the walls of the mold themselves are flushed with a liquid tempering medium via integrated medium-conducting ducts.

If the option is appropriately integrated into the displacement mechanism, it is possible to perform an infrared optical scan of the outside of the cavity, for instance, at the moment when the tempering clamp systems open and move relative to the mold after having tempered the mold.

BRIEF DESCRIPTION OF THE DRAWINGS

Further features, properties, advantages and effects based on the invention arise from the following description of preferred embodiments of the invention and with the aid of the accompanying drawing. The following is shown.

DETAILED DESCRIPTION OF THE PREFERRED EMBODIMENTS

Figure 1:
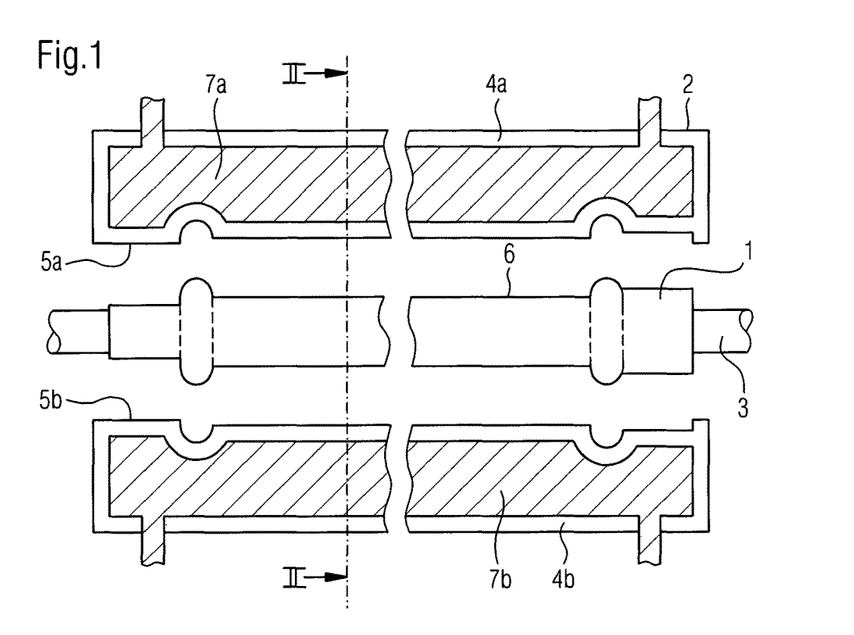
FIG. 1 an inventive device for reshaping hose blanks in a longitudinal section along a horizontal plane, wherein a thin-walled, tubular cylindrical molding tool and a pair of open half shell-like tempering elements can be recognized.

FIG. 1 shows the example of a molding tool 1 which is configured as a tubular, cylindrical body and which, when functionally joined with at least one tempering element 2, permits the omnidirectional tempering and reshaping of a hose blank 3 consisting, for example, of an elastic polyurethane material.

To receive the hose blank 3 that is to be molded, the molding tool 1 comprises an inner elongated hollow space which is preferably open at both ends. The overhanging ends of an inserted hose blank 3 can each be anchored in a fixing and/or tensioning mechanism, e.g. clamped in place by a clamping device such as clamping jaws. The two tensioning mechanisms at the ends can be displaceable relative to each other, in particular they can be distanced from each other in the longitudinal direction of the hose blank 3, in order to tauten the blank in its longitudinal direction. Moreover, at least one such fixing, clamping or tensioning mechanism can be provided with a channel which opens within a mounted hose blank 3 and through which the filling pressure within the hose blank 3 can be varied and/or set. In this way, the pressure for the blow molding process can be temporarily increased in order to expand the hose blank 3 radially so that it can lie or even press against the hollow mold of the molding tool 1 from within. The interior pressure can then be released for removal of the finished hose molding 3.

The hollow space in the molding tool 1 already has the shape of the finished hose molding 3—as a negative shape, so to speak—that is desired from the reshaping. The molding tool 1 preferably has very thin walls, which can be constant at least in some areas. Preferably, the walls are 5 mm or less thick, e.g. 3 mm or less, especially 2 mm or less, in particular 1 mm or less. If the utilized material is stable enough, the wall thickness of the molding tool 1 can be reduced further, e.g. to a wall thickness in the range from 0.3 to 0.5 mm.

The molding tool 1 preferably consists of a material with good thermal conductivity, especially metal. Materials such as iron, steel, stainless steel or brass can be considered because each of these is stable and inexpensive. However, better thermal conductivity is obtained using metals such as aluminum, copper or particularly silver, although they are less stable.

If the form of the molding tool 1 deviates from a purely cylindrical shape, then this shape must first be established by (re)shaping, e.g. by hydraulic reshaping.

The tempering element 2 is divided into two half shells 4a and 4b—and possibly into a larger number of partial shells—in the longitudinal direction, the mutually facing inner sides 5a, 5b of which are positioned against the surface 6 of the molding tool 1 such that they are form-fitting and congruent in shape and thereby permit an efficient exchange of heat with the molding tool 1.

The half or partial shells 4a, 4b of the tempering elements 2 are configured to be high in mass; in other words, they are not at all thin like the molding tool 1 but preferably each comprise at least one inner hollow space 7a, 7b, which is steadily flushed with a liquid tempering medium M at a constant temperature so that all of the half or partial shells 4a, 4b and especially their inner sides 5a, 5b facing the molding tool 1 are maintained at constant temperatures.

Figure 2A:
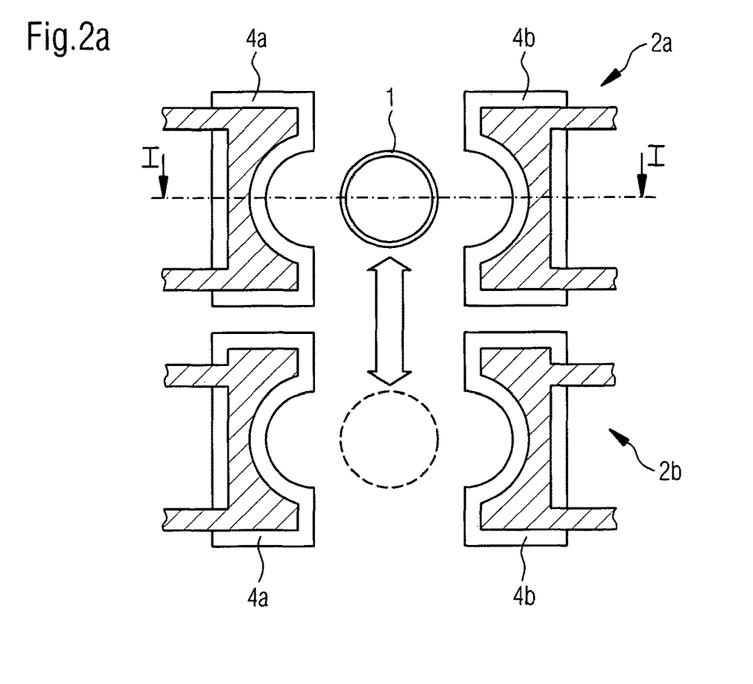
FIG. 2a the device according to FIG. 1 in a section transverse to the longitudinal axis of the thin-walled, tubular cylindrical molding tool, with two pairs of tempering clamps arranged one above the other for congruently receiving the molding tool, wherein the tempering clamps are all open.
Figure 2B:
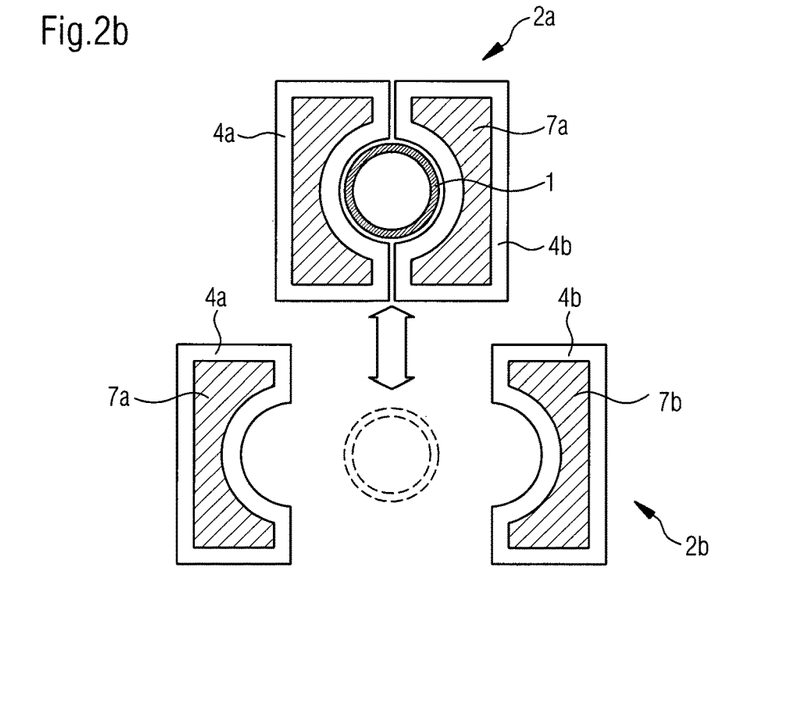
FIG. 2b the device according to FIG. 1 represented in accordance with FIG. 2a, wherein the upper pair of tempering clamps is closed around the molding tool.

At a constantly regulated medium temperature $T_M$, which corresponds to or deviates only slightly from the desired molding temperature $T_F$ on the molding surfaces, the thin walls of the molding tool 1 provide not only for the molding tool 1 itself to be heated almost instantaneously to the new temperature level when a pair or set of tempering half or partial shells 4a, 4b is applied to the outside 6 of the molding tool—as can be seen in FIG. 2b; additionally, the hose blank 3 is also heated through within a few seconds, e.g. within 10 seconds or less, especially within 6 seconds or less; in particular within 4 seconds on less.

Of course, the heating of the molding tool is not limited to the use of a tempering medium, but can also occur by electric means, such as with an electric heating element like a heating coil.

As can further be seen in FIGS. 2a and 2b, multiple tempering elements 2 or pairs or sets of half or partial shells 4a, 4b are preferably provided. Those half or partial shells 4a, 4b which join together or complement one another when they are brought together (as shown in FIG. 2b by means of the upper tempering element 2a) to form a single tempering unit 2a, 2b that surrounds the molding tool 1 are flushed by the same tempering medium M at the same flow temperature $T_v$.

Different tempering devices 2a, 2b and different pairs or sets of half or partial shells 4a, 4b can and should generally have different flow temperatures $T_{v1}$, $T_{v2}$ so that the temperature $T_F$ of the molding tool 1 can be set at different temperatures $T_{v1}$, $T_{v2}$, . . . by selecting different pairs or sets of half or partial shells 4a, 4b. No changes in fluid dynamics are necessary to achieve this; the circulation of the cooling or heating medium M is not influenced by it; rather, this temperature adjustment occurs in a purely mechanical way.

FIGS. 2a and 2b show that the molding tool 1 and/or the tempering elements 2a, 2b can be displaced relative to each other in the vertical for this purpose. Here the tempering elements 2a, 2b or the pairs or sets of half or partial shells 4a, 4b, which are each regulated to a constant temperature, are arranged vertically one above the other. In FIG. 2b, the molding tool 1 is located in the upper position, and the two half or partial shells 4a, 4b of the upper tempering element 2a are pushed together and closed over the molding tool 1 in a form-fitting way. The tempering element 2a is flushed with a hot liquid medium M at temperature $T_1$ and it transfers this temperature to the molding tool 1, for example.

To change temperature levels, the tempering clamps 4a and 4b of the tempering element 2a open, as shown in FIG. 2a, and the molding tool 1 is then shifted—in this case, lowered—to the other—in this case, to the lower—elevation of the tempering element 2b located there, the half or partial shells 4a and 4b of which are initially likewise opened. As soon as the molding tool 1 is located in the new—in this case, lower—position, the half or partial shells 4a, 4b of the respective tempering element 2b can then close around said tool 1, and its tempering clamps 4a and 4b are flushed with a medium M that has a different, e.g. lower, flow temperature $T_{v2}$ to cool the molding tool 1.

Figure 3:
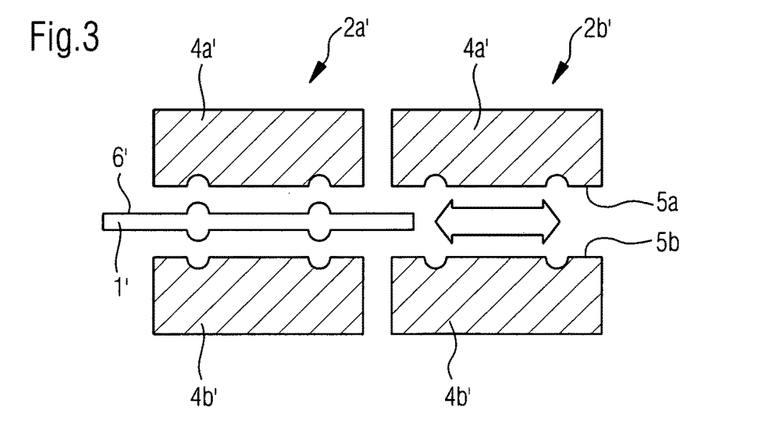
FIG. 3 a modified embodiment of the invention with a molding tool as in FIG. 1 and with two pairs of tempering clamps for congruently receiving the molding tool, although, in contrast to FIG. 2a, the two pairs of tempering clamps are not arranged one above the other but are arranged one behind the other relative to the longitudinal axis of the molding tool, i.e. displaced in the axial direction.

FIG. 3 shows a different arrangement of molding tool 1' and tempering elements 2a', 2b', wherein the mold 1' and the tempering elements 2a', 2b' can be displaced relative to each other in the horizontal. Here the tempering elements 2a', 2b', which are each maintained at constant but different temperatures $T_{v1}$, $T_{v2}$, are arranged sequentially one behind the other such that the molding tool 1' can be displaced in its longitudinal direction when the half or partial shells 4a' and 4b' of the two tempering elements 2a', 2b' are moved away from each other. Once the molding tool 1' is in the desired position within the tempering element 2a', 2b' at the desired temperature $T_{v1}$, $T_{v2}$, the half or partial shells 4a', 4b' which are located there close with a form fit over the molding tool 1' to be tempered.

Also in FIG. 3, the molding tool 1' is preferably designed in a tube shape, i.e. with an approximately constant wall thickness. In other words, there is a symmetry of contour between the inner surface of the hollow mold and the outer surface 6 of the molding tool 1' so that, ideally, the overall heat transfer resistance is the same at every point. Owing to the contour symmetry of the inner and outer surfaces 6' of the molding tool 1', the contact surfaces 5a', 5b' of the tempering elements 2a', 2b' must also be shaped congruently to the outer surface 6' of the molding tool 1' so that they can attach to said outer surface 6' with the smallest possible or a negligible gap when closed. As in the embodiment 1 described above, the mold 1' does not have to be designed such that it cannot be divided, but instead can be configured to be opened so that a hose blank can be inserted or a finished hose molding can be removed.

Figure 4:
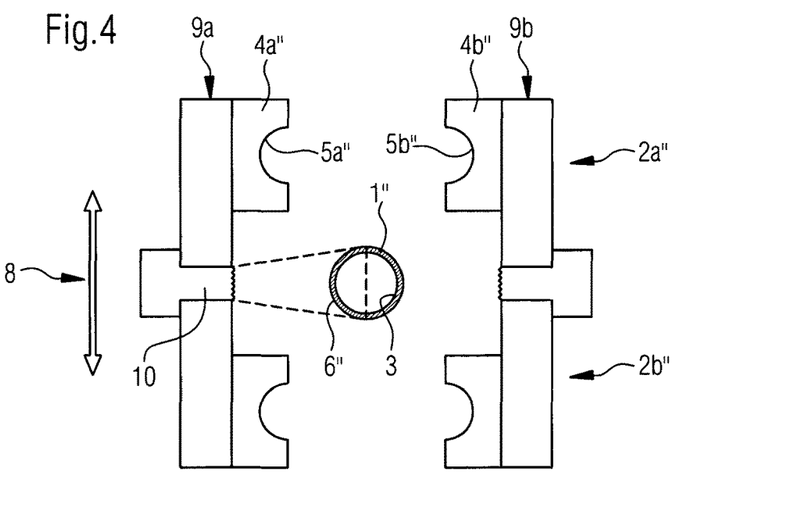
FIG. 4 a different embodiment of the invention represented in accordance with FIG. 2a, wherein the molding tool is not displaced vertically as it is there, but the half shell-like tempering elements can instead be displaced together, and wherein it is still possible to detect the temperature on the outside of the molding tool between an upper pair of tempering elements for a first temperature and a lower pair of tempering elements for a second temperature, in particular by optical scanning.

FIG. 4 shows a device 8 for jointly displacing the tempering elements 2a'', 2b'' in the vertical direction. It comprises two yoke-like frames 9a, 9b, each of which connects two half or partial shells 4a'', 4b'' of different tempering elements 2a'', 2b''.

These frames 9a, 9b can be horizontally displaceable relative to each other toward a further frame, which is not shown in FIG. 4 and which itself can have a shared vertical drive and/or at least one shared displacement guide. After the desired tempering element 2a'', 2b'' has been selected and set at the height of the molding tool 1'' by a vertical displacement of this common frame, its half or partial shells 4a'', 4b'' are moved toward each other in the horizontal direction and ultimately closed around the molding tool 1''.

The arrangement according to FIG. 4 is thus similar in function to the arrangement according to FIG. 2a, but it is supplemented by a device 10 which permits the optical scanning of the temperature T on the outer surface 6'' of the mold as an intermediate step between the opening of the one tempering clamp system 2a'' and the closing of another clamp system 2b'' over the mold 1''. As is shown in FIG. 4, the device 10 is arranged on a frame 9a, preferably between two vertically moving, alternatingly opening and closing clamping systems 2a'', 2b''.

To offer the best opportunity for indirectly scanning the effective molding temperature on the outer surface 6'' of the mold, the molding tool 1'' should have as symmetrical a contour as possible, at least in the molding region, in order to ensure the best possible reflection between the molding temperature T acting upon the hose blank 3 on the inner side of the hollow space within the molding tool 1'' and the temperature prevailing on the outer surface 6'' of the mold. A good approximation can be achieved with a wall thickness that is uniform and as thin as possible, especially with a wall thickness that is no greater than 1 mm throughout. In general, the contour symmetry is not compromised by a division of the molding tool 1'''.

The measurement device 10 is a thermo sensor that is focused on the outer surface 6'' of the molding tool 1'', especially based on the infrared radiation emitted by the molding tool 1''.

The sensor 10 can, of course, also be an IR camera for recording two-dimensional IR images, whereby in particular the uniformity of the temperature distribution over the entire outer surface 6'' of the mold can also be verified.

The described indirect monitoring of the molding temperature at defined points in time during the cycle significantly contributes to the ability to validate the process. However, even if the molding tool did not have contour symmetry suitable for approximately measuring the effective molding temperature on the mold surface, the result of measuring at a particular point in the cycle can contribute to ensuring the validity of the process by evaluating deviations from a reference measurement.

Figure 5:
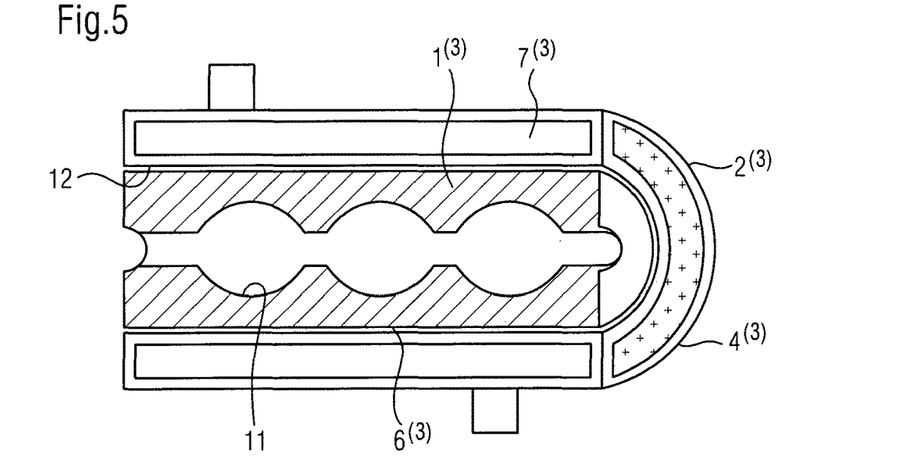
FIG. 5 another modified embodiment of the invention, wherein the molding tool does not have a constant wall thickness, but is instead configured such that the outside of the mold comprises a constant profiled cross-section along its longitudinal direction, in particular a semi-cylindrical or partially cylindrical cross-section, to which the inner sides of the half shell-like tempering elements are adapted by a corresponding hollow profile-like or hollow cylinder-like shape.

FIG. 5 shows a half shell $4^{(3)}$ of a tempering element $2^{(3)}$ and a section through a molding tool $1^{(3)}$ enclosed by it, and it represents a deviation from the arrangement shown in FIG. 1 primarily in that the molding tool $1^{(3)}$ does not have symmetry of contour. On the contrary, although the negative shape of one or more hose moldings to be molded is incorporated into the inner side 11 of the molding tool $1^{(3)}$, this negative shape cannot be discerned in the contour of the outside $6^{(3)}$ of the molding tool $1^{(3)}$. In fact, the outer surface $6^{(3)}$ of the molding tool $1^{(3)}$ is shaped like a profile, preferably like a simple cylinder, in particular a circular cylinder. Viewed from outside, the molding tool $1^{(3)}$ thus appears like a cylindrical rod. Naturally the molding tool $1^{(3)}$ can also consist of multiple individual molds or mold segments arranged serially one behind the other. Molding tools $1^{(3)}$ of this type, which are not designed to be symmetrical to the contour of the workpiece, can generally also be divided or longitudinally divided.

The tempering element $2^{(3)}$ that closes over the molding tool consists of two half shells $4a^{(3)}$, $4b^{(3)}$, each of which can be displaced laterally away from the mold and which accommodate the cylindrical tool $1^{(3)}$ in a form-fitting manner when closed. The major advantage is that the inner sides 12 of the tempering elements $2^{(3)}$ are adapted to the profiled or cylindrical shape of the outside $6^{(3)}$, i.e. in the shape of a hollow profile or hollow cylinder, and thus do not need to be adapted during a modification of the molding tool $1^{(3)}$ when other molding tools $1^{(3)}$ have the same profiled or cylindrical shape and thus fit directly into the inner surface 12 of the mold. An embodiment such as this could therefore be attractive for small-series production, where it is often necessary to change molding tools $1^{(3)}$. Owing to the irregular distribution of mass, however, this simplified form of the mold design generally requires longer tempering cycles for even through-heating.

Figure 6:
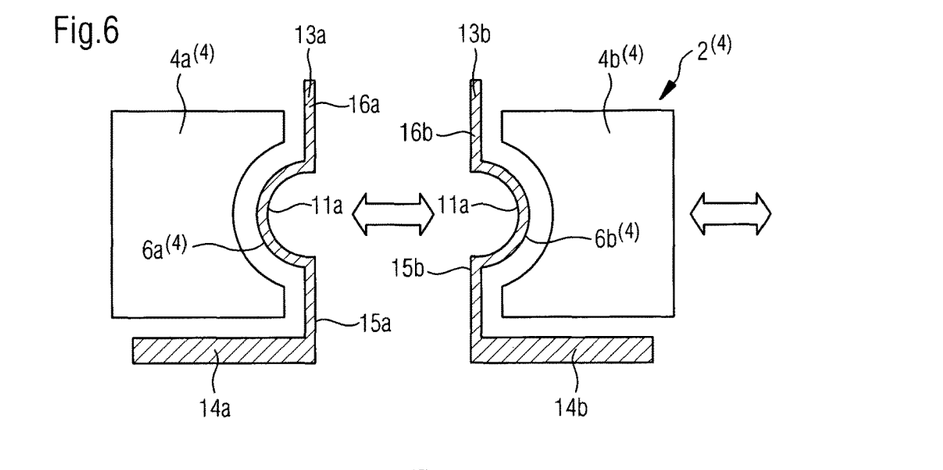
FIG. 6 yet another modified embodiment of the invention in a section transverse to the longitudinal direction of the molding tool, which is divided into two half shells along its longitudinal direction, wherein each is structured as an angle section and can be opened so that the hose blank can be inserted or the finished hose moldings can be ejected.

FIG. 6 shows an embodiment of a molding tool $1^{(4)}$ with an angular design which consists of two half shell elements 13a and 13b and which is specifically designed for mounting on an opening and closing mechanism. Each half shell 13a, 13b is provided with a preferably base-side mounting limb 14a, 14b, which permits simple mounting on the closing mechanism and ensures a powerful gap-free closure of the upwardly oriented limbs 15a, 15b that integrate the molding cavities 11a, 11b. Two tabs 16a, 16b that protrude beyond these molding cavities 11a, 11b ensure that the mold halves 13a, 13b always close without a gap.

The angular design described above allows for an especially low-mass mold design, wherein wall thicknesses from 0.2 mm to 2.5 mm, preferably from 0.5 mm to 1.5 mm, can be achieved in the region of the molding surfaces 11a, 11b. The particular angular design further permits the construction of especially long molding tools with many individual cavities arranged in series and permits them to be precisely guided in a mechanism that opens and closes over many cycles. To temper the angular half shells 13a, 13b, the congruently shaped tempering elements $4a^{(4)}$ or $4b^{(4)}$ are forcefully pressed against the outer rear sides of the half shells 13a, 13b, and so the two tabs 16a, 16b are pressed against each other with corresponding force.

Figure 7:
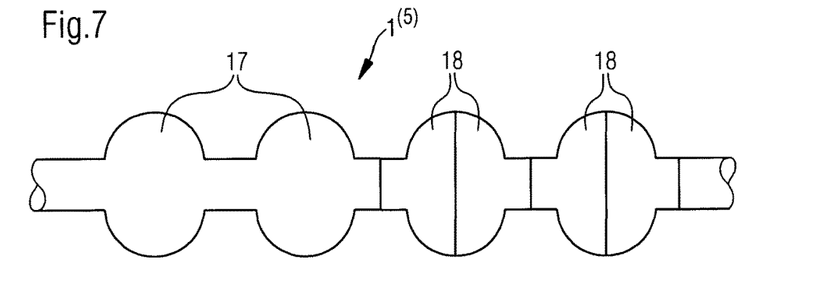
FIG. 7 a molding tool in a lateral view, wherein a plurality of hollow molds, each for one product, are arranged one after the other in a common longitudinal direction such that a corresponding multitude of hose blanks can be produced simultaneously with one or more tempering element(s), each surrounding all of said hollow molds together.

FIG. 7 shows a particular molding process by a claimed forming tube $1^{(5)}$, which permits the molding of long chains of balloon-like elements from a hose blank 3 and is utilized in the production of medical catheters, for instance. The molding process can include conventional spherical and cylindrical figures, but can also extend to asymmetrical complex shapes.

A claimed forming tube $1^{(5)}$ such as this can be produced from an initially cylindrical tube body by hydraulic reshaping, compressing or deep-drawing; in such cases, a longer, one-piece section 17 of a forming tube $1^{(5)}$ is readily obtained, as shown at left in FIG. 7. However, the ratio of the largest diameter of the balloon to the diameter of the balloon shaft limits the applicability of the molding process of the forming tube by hydraulic forming or by compressing or deep-drawing. This is why, as a rule, it is best not to exceed diameter ratios of 2.5:1 to 3:1.

In the case of higher diameter ratios, lathed or machined molding tool elements 18 can be used, as can be seen at right in FIG. 7. A plurality of molding tool elements 18 of this type can be connected, e.g. by welding, soldering or gluing, to form a continuous stabile shaping tube structure.

Figure 8:
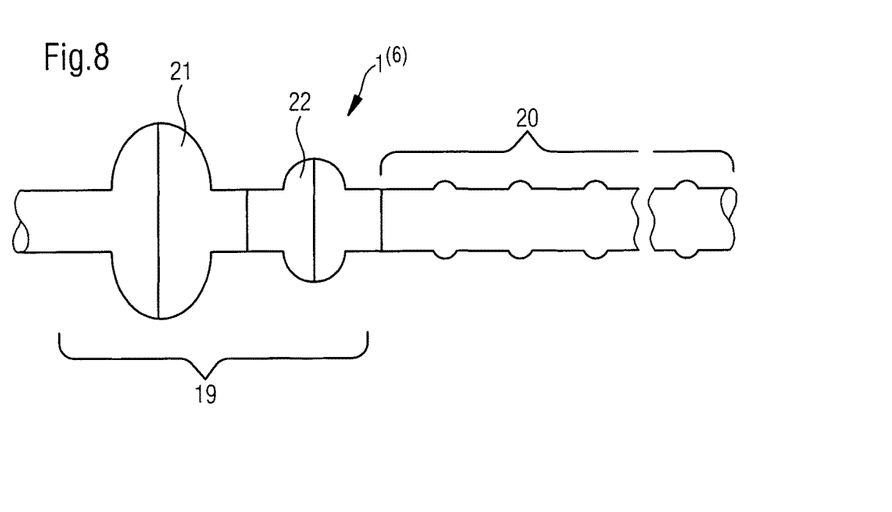
FIG. 8 an exemplary molding tool for the reshaping of a raw blank into a combined balloon- and hose-like body.

FIG. 8 shows a further specific molding process in a claimed forming tube $1^{(6)}$, which permits a basic body consisting of film to be molded to form stool-discharging drainage catheters, such as those described in WO 2009/144028. Here the molding process encompasses both a mold section 19, which forms the head part of the drainage catheter and which comprises one or more spherical expansions 21, 22 compared to the hose-like draining hose segment 20, and the drainage body anchored in the patient's rectum. The claimed molding, which features reduced-mass molding tools that are contour-symmetrical to the workpiece as well as constantly tempered heating and cooling clamps that cling closely to the workpiece, offers a significant advantage with regard to the cycle time, since it is possible to avoid high mold masses, such as those commonly seen in the molding of workpieces with large changes in diameter using conventional mold designs.

Alternatively to the half shell-like, high-mass tempering elements 2 made of a metal or a solid non-metallic, thermally conductive material, their design can also be based on cushion-like elements consisting e.g. of silicone, which are preferably filled with liquid and which can cling in a sufficiently form-fitting way to the outer profile of the molding tool without having a particularly congruent shape.

Ether-based polyurethanes such as Elastollan, which is produced by BASF-Elastogran in Lemförde, Germany, are suitable as base materials for a hose body 3 used in producing a bicycle tube. However, owing to their reduced air permeability, ester-based materials with a hardness of about 80 A to 90 A on the Shore scale are preferred in the Elastollan 600 series. While the hose blank 3 can have a diameter of e.g. 16 to 17 mm with a starting wall thickness of ca. 0.30 to 0.35 mm, a diameter of ca. 25 mm and a wall thickness of ca. 0.2 to 0.25 mm arise in the reshaped hose molding according to the invention. Once molded into a bicycle tube, e.g. from material such as Elastollan 685A, the hose molding 3 has a rubber-like elasticity that corresponds to the specific demands of the application and is advantageous to running mechanics. When typical hose filling pressures are applied, the hose body produced in this way will already begin expanding to fit well into the wheel casing at values of 1 bar.

An ether-based polyurethane like the Elastollan 1100 series with a Shore hardness range of about 80 A to 95 A can be used, for example, to mold hose and balloon components of stool drainage devices. These material durometers permit both the molding of the product-typical head unit, which anchors and seals the device in the rectum, and the shaping of a discharging hose section exhibiting the characteristics of stability and deformability that are necessary for these functions. When the raw hose has a diameter that is close to the diameter of the extracorporeal, stool-discharging hose segment, the axial stretching of the blank can be omitted during the molding of the spherically widened intracorporeal portion, and said spherical portion can be produced simply by expanding the raw hose radially into the corresponding cavity.

Other polymers, preferably with stretching and molding characteristics similar to polyurethane, can be used as an alternative to PUR.

Thermal reshaping according to the invention could also be applied to non-PUR-type elastic materials, such as Pebax, polyamide or PET. When using these materials, which require especially homogenous pre-tempering for optimally repeatable blowing, the longitudinally divided molding tool can be provided with a groove-like, precise milling to receive the as yet unmolded blank, similar to the description in WO 2013/041234.

Once through-heating is complete, the mold halves open and move a particular distance vertically over the heated hose, and when the half shells close again, the hose is enclosed in the actual molding cavity in which it is then molded into a balloon. To set a defined pre-heating level, the higher-tempered heating tempering element 2 can be briefly positioned against the mold wall in order to transfer the energy required to reach the pre-heated level in the mold. Alternatively, a further set of clamp-like tempering elements that are quickly tempered to the pre-heated level can be added to the device. This can be done with the tempering elements oriented both vertically and horizontally.

As an alternative to the method described here for reshaping hose material manufactured in a separate production process, the extruded raw hose can also be molded immediately after leaving the extrusion head, while it is still in a hot deformable state, by a suitable outer mold that receives the extruded material under sustained blowing pressure in the lumen of the hose body. In the ideal case, the heating tempering element can then be omitted, and only the cooling element is pressed against the mold surface.

The method for producing a hose element by means of thermal reshaping in a low-mass molding tool manufactured e.g. by compression, deep-drawing, eroding or milling is described hereafter with reference to the device described in FIG. 4, with vertically displaceable tempering clamp systems:

A. Introducing the hose blank 3 consisting e.g. of Elastollan 1185A PUR into the molding tool 1″;
B. Bluntly clamping the hose 3 at the hose-supplying end of the blank 3 to be molded on the same side as the material reserve and roller;
C. Clamping the free front end of the hose blank 3 via a ventilation cone or a similar pin-like structure;
D. Axially stretching the hose blank 3 by moving the hose ends apart axially;
E. Applying blowing pressure to the stretched blank 3 and radially elongating the hose blank 3 into the forming tube 1″;
F. Positioning the half shells 4a″ and 4b″ of a first tempering element 2a″ against the molding tool 1″ and pressing it form-fittingly against the outer surface 6″ of the mold 1″ until a tempering of the inner mold surface has reached a temperature of ca. 160 to 170° C.;
G. Opening the half shells 4a″ and 4b″ of the first tempering element 2a″; vertically displacing the frame system 9a, 9b so that the level of the half shells 4a″ and 4b″ of a second temping element 2b″ is at the height of the molding tool 1″; positioning and precisely closing the half shells 4a″ and 4b″ around the surface of the forming tube 1″; cooling the forming tube to a temperature of ca. 40° C.;
H. Opening the elements 4a″ and 4b″; removing the reshaped hose molding 3 toward the free ventilated end; simultaneously pulling the next, as yet unmolded hose from the material reserve side into the forming tube;
I. Detaching the molded hose 3, preferably such that the detachment occurs in the molded region and thereby facilitates a shape-defined free end for the secure and automatable insertion of the ventilation pin and the automatic clamping thereof;
J. Inserting the ventilation pin into the detached hose end of the balloon to be molded and clamping it; then restarting the cycle with axial stretching of the hose.

In a molding tool $1^{(4)}$ designed such that it is divided into half shells 13a, 13b for optimally material-saving molding, the method can have the following sequence of steps:

A. Introducing the hose blank 3 consisting e.g. of Elastollan 1185A PUR into the open longitudinally divided molding tool $1^{(4)}$ to e.g. 50% of the overall length of the tool $1^{(4)}$;
B. Bluntly clamping the hose 3 at the hose-supplying end of the blank 3 to be molded on the same side as the material reserve and roller;
C. Positioning the ventilation cone or a similar pin-like structure against the free front end of the hose blank 3 and into the open mold, and clamping the hose end 3 over the pin unit;
D. Axially stretching the hose blank 3 by moving the hose ends apart axially by a minimum amount so that the half shells 13a, 13b can close over the stretched hose 3;
E. Applying blowing pressure to the stretched blank 3 and radially elongating the hose blank 3 into the forming tube
F. Positioning the half shells $4a^{(4)}$ and $4b^{(4)}$ of a first tempering element $2a^{(4)}$ against the molding tool $1^{(4)}$ and pressing it form-fittingly against the outer surface $6a^{(4)}$, $6b^{(4)}$ of the mold until a tempering of the inner mold surface has reached a temperature of ca. 160 to 170° C.;
G. Opening the half shells $4a^{(4)}$ and $4b^{(4)}$ of the first tempering element $2a^{(4)}$; vertically displacing the molding tool $1^{(4)}$ to the level of the first tempering element $2a^{(4)}$ to a height, wherein the half shells $4a^{(4)}$ and $4b^{(4)}$ of a second tempering element $2b^{(4)}$ are located at the height of the molding tool $1^{(4)}$; positioning and precisely closing the half shells $4a^{(4)}$ and $4b^{(4)}$ around the surface of the forming tube $1^{(4)}$; cooling the forming tube $1^{(4)}$ to a temperature of ca. 40° C.;
H. Opening the half shells $4a^{(4)}$ and $4b^{(4)}$ and opening the half shells 13a, 13b of the molding tool $1^{(4)}$; relaxing the axial tension by maneuvering the pin-side clamping mechanism into the open mold
I. Separating the molded workpiece 3 from the raw hose 3 by means of a cutting mechanism; ejecting the molding 3 from the pin-side clamp;
J. Positioning the pin-side clamp against the cut stub on the material reserve side; inserting the pin into the stub; clamping the stub; opening the clamp on the material-supplying side; then restarting the cycle with axial stretching of the hose.

LIST OF REFERENCE SIGNS

1. Molding tool
2. Tempering element
3. Hose blank
4. Half shell
5. Inner side
6. Surface
7. Hollow space
8. Displacement device
9. Frame
10. Measuring device
11. Inner side of the molding tool
12. Inner side of the tempering element
13. Half shell element
14. Mounting limb
15. Limb
16. Tab
17. Molding tool section
18. Molding tool element
19. Section
20. Section
21. Expansion
22. Expansion

The invention claimed is:

1. Method for the thermal reshaping of hose blanks consisting of elastic raw hose material, wherein the hose blank is located in a hollow, single- or multi-part molding tool during the reshaping, wherein the inner side of the hollow mold corresponds as a negative to the shape that is to be impressed upon the hose blank, characterized in that the tempering of the molding tool that is necessary for reshaping occurs by means of tempering elements with half or partial shells which close form-fittingly over the mold, and the inner sides of said shells that face the molding tool are congruent with the outer side of said molding tool, wherein no tempering device, no ducts or other hollow spaces for circulating a tempering medium at all are integrated into the molding tool itself, and wherein the temperature of each tempering element is kept constant during the process, while, to modify the temperature of the molding tool, a different tempering element with a different constant temperature is positioned against the molding tool.

2. Method according to claim 1, characterized in that the molding tool is an elongated hollow profile with a lateral surface surrounding an inner hollow space for receiving the hose blank.

3. Method according to claim 1 characterized in that the molding tool is divided along its longitudinal direction into two or more half or partial shells which can be displaced away from each other in the radial direction in order to open the hollow mold and insert the hose blank and/or eject a finished molding.

4. Method according claim 1, characterized in that the single or multi-part molding tool each consists of a flat part with a thin wall thickness d≤5 mm.

5. Method according to claim 1—characterized in that the single or multi-part molding tool consist of a material with a thermal conductivity of $\lambda \geq 20$ W/(m*K), or of a material with a thermal conductivity of $\lambda \geq 50$ W/(m*K), or of a material with a thermal conductivity of $\lambda \geq 100$ W/(m*K).

6. Method according to claim 1 characterized in that the single or multi-part molding tool comprise metal.

7. Method according to claim 1 characterized in that the contour between the inner side of the molding tool and the outer side of the molding tool are symmetrical, the temperature of the inner side of the molding tool corresponds to the temperature of the outer side of the molding tool, such that after the occurrence of a jump in temperature by ΔT on the outer side of the molding tool, the temperature TI on the inner side of the molding tool deviates from the temperature TA on its outer side only by a residual amount E after a brief transitional period of less than 5 s:

$$|TA-TI| \leq \varepsilon,$$

where $\varepsilon=0.5*\Delta T$, or $\varepsilon=0.3*\Delta T$, or $\varepsilon=0.2*\Delta T$, or $\varepsilon=0.1*\Delta T$.

8. Method according to claim 7, characterized in that the temperature TI on the inner side of the molding tool can be determined by recording the temperature TA on the outer side.

9. Method according to claim 1 characterized in that the outer side of the molding tool is rotationally symmetrical around the longitudinal axis of the molding tool, so that the shape of the tempering elements and/or their half or partial shells is not dependent upon the shape that is to be impressed upon the hose blank.

10. Method according to claim 1 characterized in that a one-piece molding tool consisting of a metallic tube body is produced by compressing said tube body into a shaping outer mold, or by compressing said tube body into a shaping outer mold while applying hydraulic pressure to the interior of the tube.

11. Method according to claim 1 characterized in that a divided molding tool consisting of a metallic tube is produced by deep-drawing said tube over a shaping mold, or by deep-drawing said tube over a shaping mold while applying hydraulic pressure to one side.

12. Method according to claim 1 characterized in that the temperature of the tempering elements is kept constant during the process by the perfusion of a fluid medium through one or more integrated hollow spaces.

13. Method according to claim 1 characterized in that the tempering elements are configured as longitudinally divisible half or partial shells, the inner sides of which correspond as a negative to the outer side of the molding tool.

14. Method according to claim 1 characterized in that the opening and closing half shells or partial shells of the tempering elements are moved towards the molding tool from outside in a radial direction with respect to the center of the molding tool.

15. Method according to claim 1 characterized in that the molding tool and the tempering elements are displaced relative to each other in vertical and/or horizontal direction, in order to change the molding temperature.

16. Method according to claim 1 characterized in that a plurality of tempering elements are connected or coupled together and/or to a common frame and/or to a common driving mechanism for a synchronous or joint movement, or for a joint movement in a longitudinal direction of the molding tool.

17. Device for the thermal reshaping of hose blanks consisting of elastic raw hose material, comprising a hollow, single- or multi-part molding tool with a hollow mold for receiving at least one hose blank while it is being reshaped, wherein the inner side of the hollow mold corresponds as a negative to the shape that is to be impressed upon the hose blank, characterized in that the molding tool is free of internal ducts and other hollow spaces for the circulation of a tempering medium, while half or partial shells, which are separate from the mold and which close form-fittingly over the mold, are provided to temper the molding tool, wherein the inner sides of said shells which face the molding tool are congruent with the outer side of said molding tool and wherein the shells comprise an arrangement for keeping the temperature of each tempering element constant during the process, and wherein at least one mechanism is provided for selectively closing different tempering elements at different temperatures around the molding tool.

18. Device according to claim 17 characterized in that the arrangement for keeping the temperature of each tempering element constant during the process comprises internal hollow spaces in each tempering element for the perfusion of a tempering medium.

* * * * *